US009641907B2

(12) United States Patent
Lu (10) Patent No.: US 9,641,907 B2
(45) Date of Patent: May 2, 2017

(54) IMAGE TRANSMISSION SYSTEM WITH FINITE RETRANSMISSION AND METHOD THEREOF

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 468 days.

(21) Appl. No.: 14/146,195

(22) Filed: Jan. 2, 2014

(65) Prior Publication Data

US 2015/0189393 A1  Jul. 2, 2015

(51) Int. Cl.
| | |
|---|---|
| *H04N 19/159* | (2014.01) |
| *H04N 21/6375* | (2011.01) |
| *H04N 21/2383* | (2011.01) |
| *H04N 21/234* | (2011.01) |
| *H04N 21/438* | (2011.01) |
| *H04N 21/44* | (2011.01) |
| *H04N 21/43* | (2011.01) |
| *H04N 21/6583* | (2011.01) |

(52) U.S. Cl.
CPC ..... *H04N 21/6375* (2013.01); *H04N 21/2383* (2013.01); *H04N 21/23406* (2013.01); *H04N 21/4302* (2013.01); *H04N 21/4382* (2013.01); *H04N 21/44004* (2013.01); *H04N 21/6583* (2013.01)

(58) Field of Classification Search
CPC ..... H04L 69/329; H04L 67/02; H04L 67/327; H04L 51/046; H04L 51/34; H04L 63/0428; H04L 63/0435; H04L 65/602; H04L 9/0861; H04L 9/0891; H04L 9/3236; H04L 12/1827; H04L 12/40039; H04L 1/0057
USPC ........................................................ 725/116
See application file for complete search history.

(56) References Cited

U.S. PATENT DOCUMENTS

| | | | | |
|---|---|---|---|---|
| 8,045,219 | B2 * | 10/2011 | Pruden .................. | G06K 1/121 358/1.9 |
| 8,265,171 | B2 | 9/2012 | Steinbach | |
| 2002/0053058 | A1 * | 5/2002 | Lee ....................... | H04L 1/0013 714/748 |
| 2004/0246529 | A1 * | 12/2004 | Pruden .................. | G06K 1/121 358/3.28 |
| 2005/0035971 | A1 * | 2/2005 | Jung ..................... | G11B 27/10 345/501 |

(Continued)

*Primary Examiner* — Dave Czekaj
*Assistant Examiner* — Kehinde O Abimbola
(74) *Attorney, Agent, or Firm* — Muncy, Geissler, Olds & Lowe, P.C.

(57) ABSTRACT

An image transmission system with finite re-transmission function is disclosed. The system of the invention comprises a communication channel, a transmitting device and a receiving device. The transmitting device comprises an encoder, a first coded buffer and a transmitter. The receiving device comprises a receiver, a second coded buffer, a decoder, a decoded buffer and a display control unit. The system of the invention uses line buffers due to its line-based encoding/decoding scheme, to thereby reduce hardware cost. In addition, the image transmission system of the invention conducts a skip-line-encoding mechanism, a stop-retransmitting mechanism and a line-ID-control mechanism, to thereby achieve a real-time transmission/display.

44 Claims, 9 Drawing Sheets

(56) References Cited

U.S. PATENT DOCUMENTS

| | | | |
|---|---|---|---|
| 2005/0117059 A1* | 6/2005 | Smits | H04N 9/641 348/558 |
| 2005/0232613 A1* | 10/2005 | Iwamoto | H04N 5/76 386/286 |
| 2009/0094657 A1 | 4/2009 | Miller et al. | |
| 2012/0006894 A1* | 1/2012 | Pruden | G06K 1/121 235/454 |
| 2012/0019400 A1* | 1/2012 | Patel | G08C 17/00 340/870.15 |
| 2012/0019719 A1* | 1/2012 | Takesue | H04N 5/4401 348/521 |
| 2012/0050310 A1* | 3/2012 | Patel | G08C 17/00 345/593 |

* cited by examiner

IMAGE TRANSMISSION SYSTEM WITH FINITE RETRANSMISSION AND METHOD THEREOF

BACKGROUND OF THE INVENTION

Field of the Invention

The invention relates to a transmission system, and more particularly, to an image transmission system and method with a finite re-transmission function.

Description of the Related Art

Figure 1:
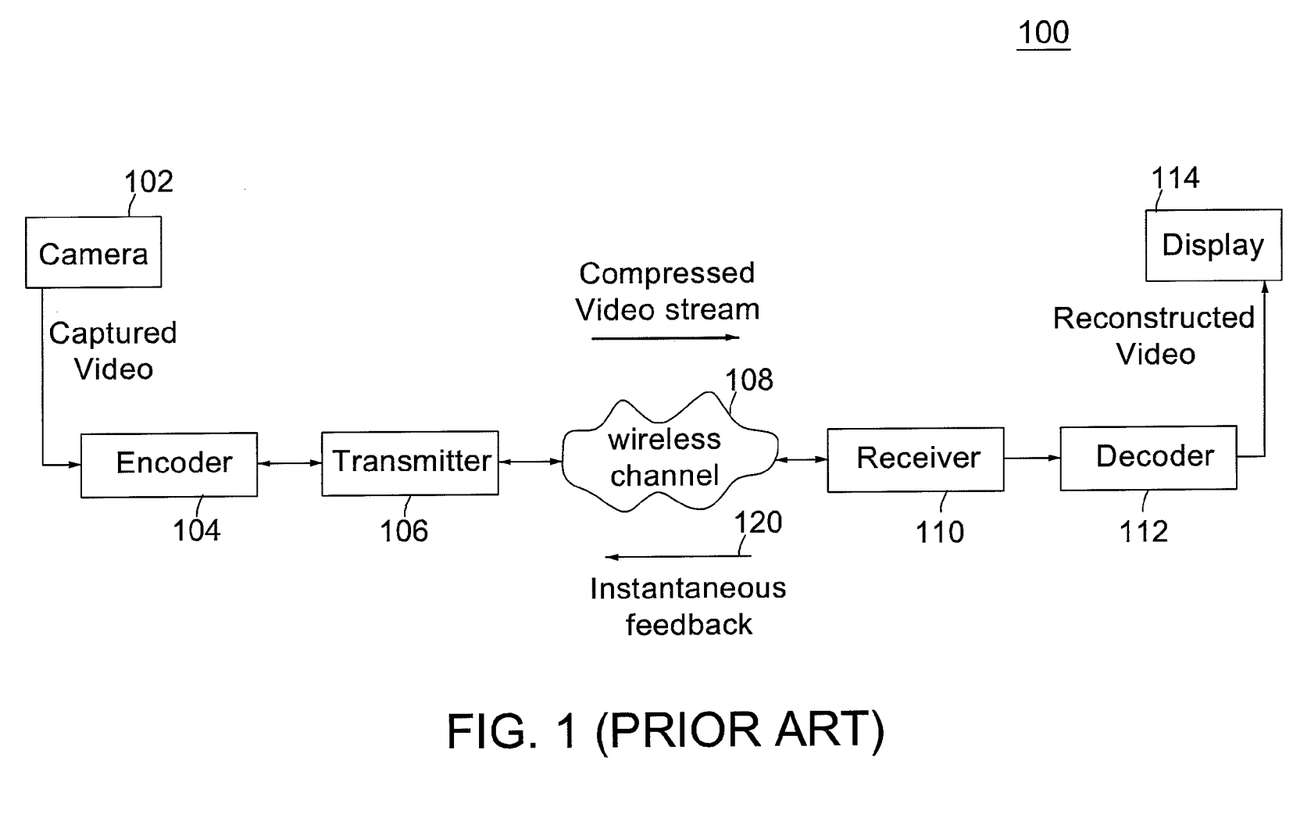
FIG. 1 is a block diagram of a conventional video transmission system.

A real-time image transmission system is well adopted in many applications. For example, U.S. Pat. No. 8,265,171 discloses an error resilient video transmission system. An exemplary video transmission system is illustrated in FIG. 1. The video camera 102 captures video frames at a certain frame rate (e.g., 30 frames/second) and the captured video frames are then encoded by the video encoder 104. The video encoder 104 preferably may be a block-based hybrid video coding structure (e.g., MPEG-X, H.264) using motion compensated prediction (MCP) and transform coding (e.g., discrete cosine transform, DCT). Encoded (and compressed) video is then sent over a wire/wireless channel 108 using a transmitter 106. At the receiver side, once the receiver 110 receives a video packet, it produces an acknowledgement (instantaneous feedback) and sends it immediately over a wired/wireless feedback channel 120 to the transmitter 106, informing the transmitter 106/encoder 104 if the transmitted video packet was successfully received or damaged in the wired/wireless channel 108. In the meantime, the video packet is decoded by a decoder 112 and its reconstructed video is presented on display 114. Although shown separately, the encoder 104 and the transmitter 106 may be integrally formed and functioned as a single component. Likewise, the receiver 110 and the decoder 112 may also be integrally formed and functioned as a single component.

U.S. Pat. No. 8,265,171 is based on this instantaneous feedback information from the receiver 110. Specifically, its transmitter 106/encoder 104 determines how best to handle any lost packet(s) and how to encode the next captured video frame. As noted, the error-resilient real-time digital video transmission system is based on feedback from the receiver 110 regarding successfully transmitted or lost packets, along with synchronized error concealment that is performed at both the encoder 104 and the decoder 112.

Many network transmission systems use TCP/IP protocol, which re-transmit packets if a transmitter gets packet lost information by checking acknowledged packets from a receiver. The transmitter will keep re-transmitting if not receiving an acknowledgment from receiver. The property will guarantee the transmission correction, but it may not be suitable for real-time transmission. Besides, many real-time image transmission systems expect a DRAM-less solution to reduce cost. Accordingly, there is a need for a real-time image transmission system operating without using a DRAM buffer and with a finite re-transmission function.

SUMMARY OF THE INVENTION

In view of the above-mentioned problems, an object of the invention is to provide an image transmission system operating without using a DRAM buffer and with a finite re-transmission function.

One embodiment of the invention provides an image transmission system with a finite re-transmission function. The image transmission system comprises a communication channel, a transmitting device and a receiving device. The transmitting device comprises an encoder, a first coded buffer and a transmitter. The encoder determines whether to encode a source pixel line into a first encoded bit stream according to a first state signal. The first coded buffer stores the first encoded bit stream and generates the first state signal. The transmitter transforms the encoded bit stream into data packets and transmits the data packets over the communication channel. The receiving device comprises a receiver, a second coded buffer, a decoder, a decoded buffer and a display control unit. The receiver receives a data packet, determines whether to send an acknowledgement and transform the data packet into a second encoded bit stream according to a state signal and whether a data packet is correctly received. The second coded buffer stores the second encoded bit stream and generates the second state signal. The decoder determines whether to decode the second encoded bit stream into a decoded pixel line according to the second state signal and determining whether to update a decoded ID list, output a control information and store the decoded pixel line in the decoded buffer according to a second line ID of the decoded pixel line, a display information and whether the second encoded bit stream is decoded successfully. The display control unit outputs the display information and transfers a corresponding decoded pixel line for display according to the control information. Here, the first state signal and the second state signal respectively indicate a first buffer fullness relative to a capacity of the first coded buffer and a second buffer fullness relative to a capacity of the second coded buffer.

Another embodiment of the invention provides a transmission method applied in an image transmission system having a communication channel, a transmitting device and a receiving device. The transmitting device comprises a first coded buffer and the receiving device comprises a second coded buffer and a decoded buffer. The transmission method comprises the steps of: determining whether to encode a source pixel line with a first line ID into a first encoded stream, store the first encoded stream in the first code buffer, transform the first encoded bit stream into data packets and transmit the data packets over the communication channel according to a first state signal; determining whether to send an acknowledgement in response to one data packet from the communication channel, transform the data packet into a second encoded bit stream and store the second encoded bit stream in the second coded buffer according to a second state signal and whether the data packet is received correctly; determining whether to decode the second encoded bit stream into a decoded pixel line according to the second state signal; determining whether to update a decoded ID list, output a control information and store the decoded pixel line in the decoded buffer according to a second line ID of the decoded pixel line, a display information and whether the second encoded bit stream is decoded successfully; and, outputting the display information and transferring a corresponding decoded pixel line for display according to the control information. Here, the first state signal and the second state signal are generated by the first coded buffer and the second coded buffer. The first state signal and the second state signal are generated by the first coded buffer and the second coded buffer. The first state signal and the second state signal respectively indicate a first buffer fullness relative to a capacity of the first coded buffer and a second buffer fullness relative to a capacity of the second coded buffer.

Another embodiment of the invention provides a receiving device. The receiving device comprises a receiver, a coded buffer, a decoder, a decoded buffer and a display control unit. The receiver receives a data packet, determines whether to send an acknowledgement and transform the data packet into an encoded bit stream according to a state signal and whether a corresponding data packet is correctly received. The coded buffer stores the encoded bit stream and generates the state signal. The decoder determines whether to decode the encoded bit stream into a decoded pixel line according to the state signal and determining whether, to update a decoded ID list, output a control information and store the decoded pixel line in the decoded buffer according to a first line ID of the decoded pixel line, a display information and whether the encoded bit stream is decoded successfully. The display control unit outputs the display information and transfers a corresponding decoded pixel line for display according to the control information. Here, the state signal indicates a buffer fullness relative to a capacity of the coded buffer.

Another embodiment of the invention provides a transmitting device. The transmitting device comprises an encoder, a coded buffer and a transmitter. The encoder determines whether to encode a source pixel line into an encoded bit stream according to a state signal. The coded buffer stores the encoded bit stream and generates the state signal. The transmitter transforms the encoded bit stream into data packets and transmits the data packets over a communication channel. Here, the state signal indicates a buffer fullness relative to a capacity of the coded buffer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

As used herein and in the claims, the term "a," "an," "the" and similar terms used in the context of the present invention (especially in the context of the claims) are to be construed to cover both the singular and plural unless otherwise indicated herein or clearly contradicted by the context.

A feature of the invention is to perform a line-based encoding/decoding scheme for real-time image transmission/display to reduce the storage amount. Accordingly, a transmitting device and a receiving device of the invention can use line buffers (implemented with SRAM) instead of a DRAM buffer to store a small amount of source pixel lines, encoded bit streams, data packets and decoded pixel lines, for real-time image transmission/display. Another feature of the invention is to send a "fake" acknowledgement (described below) by a receiver whenever a data packet is not received successfully and a buffer fullness of its coded buffer is less than a low-level threshold. Another feature of the invention is to conduct adaptive encoding by an encoder based on the fullness of its coded buffer for real-time image transmission. Another feature of the invention is to conduct a line-ID-control mechanism (described below) by a decoder and a display control unit to have a real-time image display when no enough data can be displayed or at least one pixel line has been skipped over.

Figure 2:
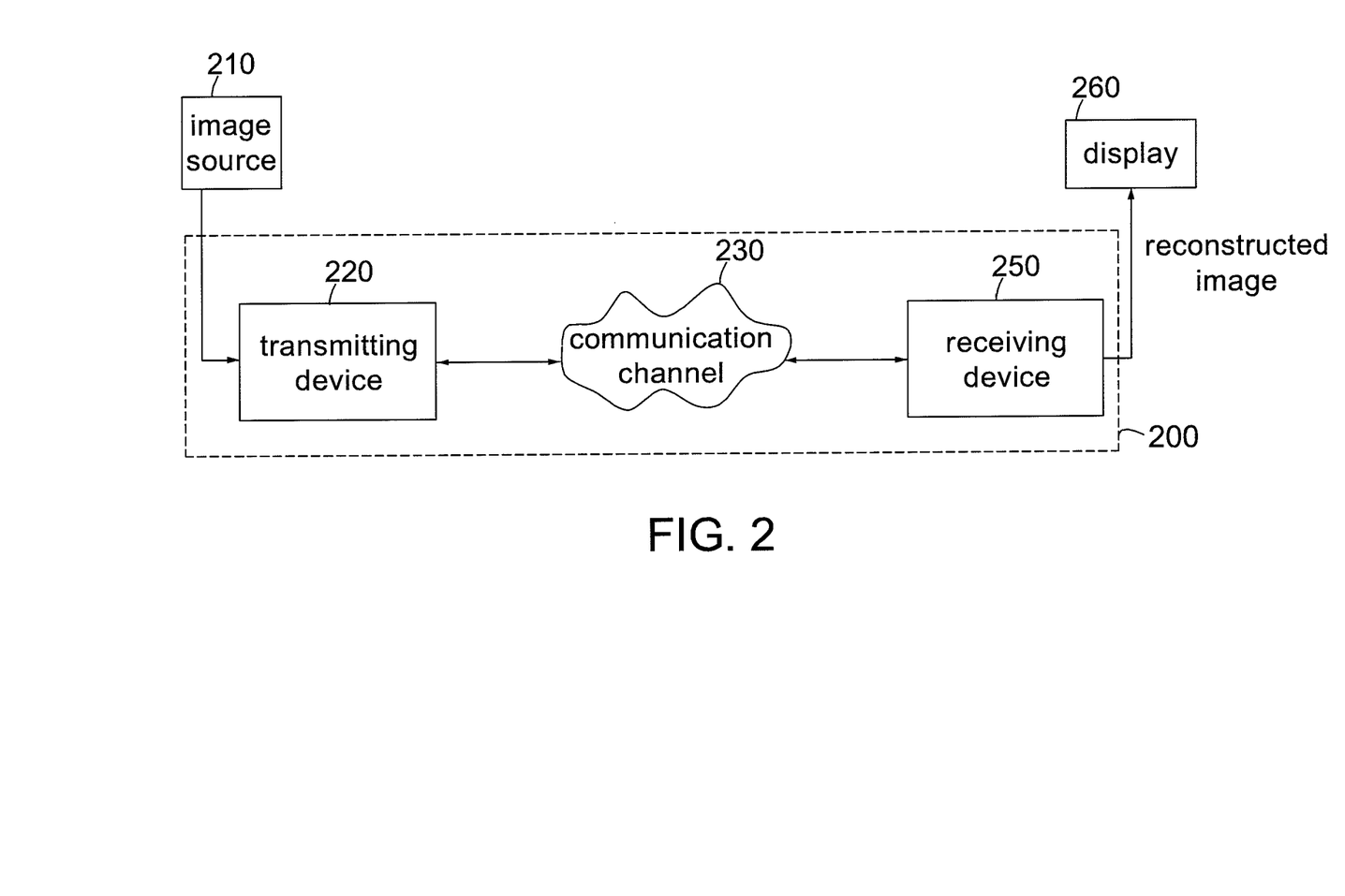
FIG. 2 is a block diagram showing an image transmission system with a finite re-transmission function according to one embodiment of this invention.

FIG. 2 is a block diagram showing an image transmission system with a finite re-transmission function according to one embodiment of this invention. Referring to FIG. 2, an image transmission system 200 with a finite re-transmission function includes a transmitting device 220, a communication channel 230 and a receiving device 250. An image source 210 supplies source pixel lines to the transmitting device 220. The transmitting device 220 transforms the pixel lines into data packets and then transmits the data packets to the receiving device 250 via the communication channel 230. The communication channel 230 is a network channel, where the communication between the transmitting device 220 and the receiving device 250 is conducted through packet exchange. When data packets are received correctly, the receiving device 250 sends an acknowledgment back for each data packet to the transmitting device 220, decodes the data packets into a decoded pixel line and finally sends the decoded pixel line to the display 260 for image display. On the contrary, the transmitting device 220 re-transmits the lost data packet to the receiving device 250 if its corresponding acknowledgement has not been received after a preset interval (herein called "conventional re-transmitting mechanism").

Figure 3:
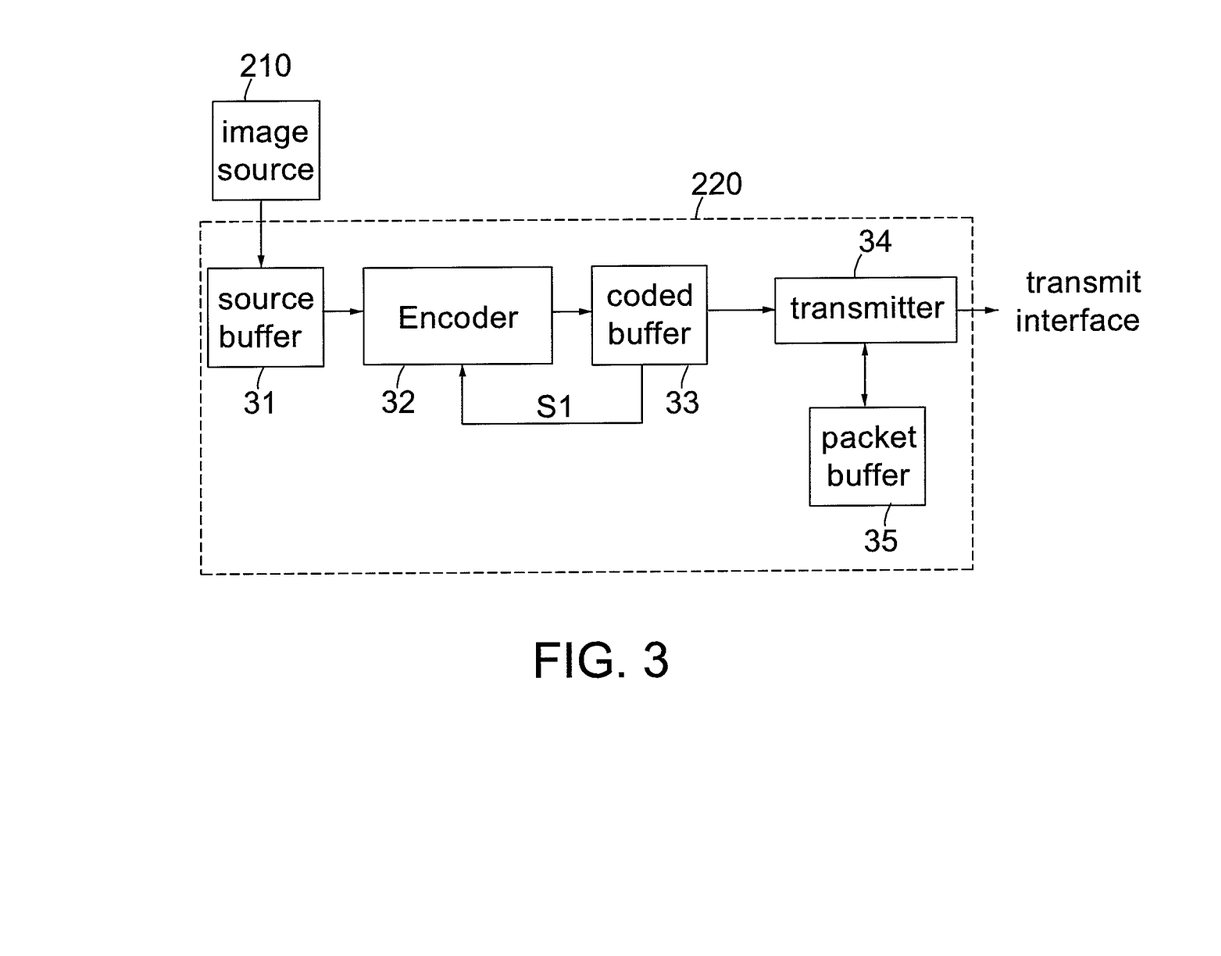
FIG. 3 is a detailed diagram showing the transmitting device of the image transmission system in FIG. 2 according to one embodiment of this invention.
Figure 4A:
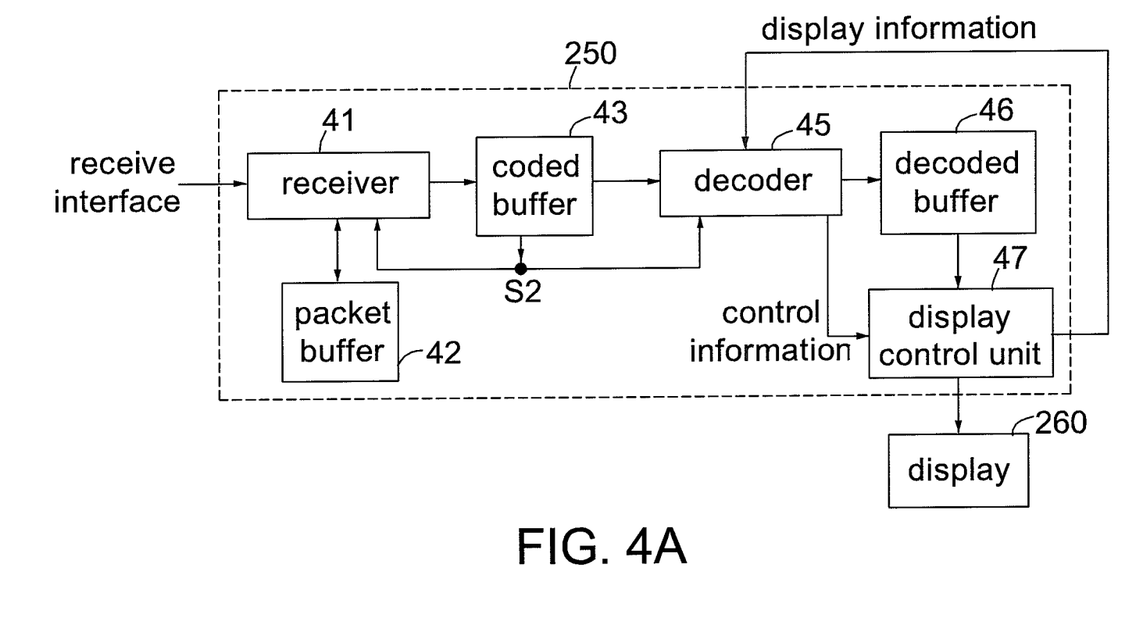
FIG. 4A is a detailed diagram showing the receiving device of the image transmission system in FIG. 2 according to one embodiment of this invention.

FIG. 3 is a detailed diagram showing the transmitting device of the image transmission system in FIG. 2 according to one embodiment of this invention. Referring to FIG. 3, the transmitting device 220 includes a source buffer 31, an encoder 32, a coded buffer 33, a transmitter 34 and a packet buffer 35. The encoder 32 is a line-based encoder, which performs line-based encoding on a source pixel line from the source buffer 31 to generate an encoded bit stream. Specifically, the encoder 32 encodes image pixels on a line-by-line basis or on a dual-line-by-dual-line basis. The operations of the line-based encoder are described in a co-pending U.S. patent application Ser. No. 14/096,488, the disclosure of which is incorporated herein by reference in its entirety. FIG. 4A is a detailed diagram showing the receiving device of the image transmission system in FIG. 2 according to one embodiment of this invention. Referring to FIG. 4A, the receiving device 250 includes a receiver 41, a decoder 45, a coded buffer 43, a decoded buffer 46, a display control unit 47 and a packet buffer 42. Since the encoder 32 is a line-based encoder, the decoder 45 is correspondingly a line-based decoder, which performs line-based decoding on an encoded bit stream from the coded buffer 43 to generate a decoded pixel line. Accordingly, the transmitting device 220 and the receiving device 250 of the invention can use line buffers 31, 33, 35, 42, 43 and 46 (implemented with SRAM buffers) instead of a DRAM buffer to store a small amount of source pixel lines, encoded bit streams, data packets and decoded pixel lines for real-time image transmission/display. Here, the capacities of the buffers 31, 33, 35, 42, 43 and 46 are far less than those used in the conventional image transmission system that performs frame-based encoding/decoding scheme. Please be noted that although shown separately, the encoder 32 and the transmitter 34 may be integrally formed and functioned as a single component. Likewise, the receiver 41 and the decoder 45 may also be integrally formed and functioned as a single component.

Referring back to FIG. 3, the image source 210 supplies several source pixel lines to the source buffer 31. Then, the encoder 32 encodes each source pixel line with a corresponding line ID into an encoded bit stream and stores it in the coded buffer 33. In general, the appended line IDs are numbered in an increasing sequence. Please be noted that the encoded bit stream contains a line ID. Accordingly, both the encoder 32 and the decoder 45 clearly know which pixel line is skipped. The transmitter 34 transforms the encoded bit stream into data packets and then transmits the data packets to the receiver 41 over the communication channel 230. The transmitter 34 communicates with the receiver 41 through an acknowledgment mechanism. If a corresponding acknowledgment is received after a data packet is sent, the transmitter 34 deletes its duplicate data packet in the packet buffer 35 and starts to transmit the next data packet. On the contrary, if no acknowledgment from the receiver 41 is received after a data packet has been sent for a preset interval, the transmitter 34 will re-transmit the lost packet again. However, a real-time image transmission system could not afford to conduct time-consuming re-transmission many times because the time-consuming re-transmission may cause the system to be unable to supply images for display in correct timing. To solve the above problem and achieve a real-time image transmission/display, a skip-line-encoding mechanism, a stop-retransmitting mechanism and a line-ID-control mechanism are provided in the invention and will be described below.

During operation, the coded buffer 33 periodically generates a state signal S1 to the encoder 32, where the state signal S1 indicates a first buffer fullness relative to the capacity of the coded buffer 33. In an embodiment, the first buffer fullness is a fraction of the coded buffer (33) capacity. The encoder 32 determines whether to encode the current source pixel line or the following source pixel line according to the state signal S1. When the state signal S1 indicates the first buffer fullness is equal to or greater than a high-level threshold T1 (i.e., the coded buffer 33 is near full), the encoder 32 stops encoding (skip) a current source pixel line or/and the following source pixel line (herein called "skip-line-encoding mechanism") to avoid data overflow in the coded buffer 33; otherwise, the encoder 32 keeps encoding.

As to the receiving device 250, the coded buffer 43 periodically generates a state signal S2 to the receiver 41 during operation. Here, the state signal S2 indicates a second buffer fullness relative to the capacity of the coded buffer 43. In an embodiment, the second buffer fullness is a fraction of the coded buffer (43) capacity. The receiver 41 and the decoder 45 constantly monitor the state signal S2. The receiver 41 determines whether to send an acknowledgement according to the state signal S2 and whether a data packet is not correctly received. When the data packet is not correctly received and the state signal S2 indicates the second buffer fullness is equal to or less than a low-level threshold T2 (i.e., the coded buffer 43 is near empty), the receiver 41 stops the conventional re-transmitting mechanism by sending back a "fake" acknowledgment to the transmitter 34 (herein called "stop-retransmitting mechanism"). The purpose of the "stop-retransmitting mechanism" (sending back a fake acknowledgment) is to accelerate the data transfer from the transmitter 34 to avoid data emptiness in the decoded buffer 45. Certainly, when the state signal S2 is back to normal (the second buffer fullness is greater than the low-level threshold T2) and a data packet is not correctly received, the receiver 41 switches back to the conventional re-transmitting mechanism. When a data packet is correctly received, the receiver 41 sends an acknowledgement, transforms the data packets into an encoded bit stream and stores the encoded bit stream in the coded buffer 43.

Next, the decoder 45 determines whether to decode the encoded bit stream into a decoded pixel line according to the state signal S2. When the state signal S2 indicates the second buffer fullness is equal to or less than a low-level threshold T2, the decoder 45 stops decoding; otherwise, the decoder 45 decodes the encoded bit stream into a decoded pixel line. Assuming that the line IDs of the decoded pixel lines of a frame are numbered in an increasing sequence. According to a display information, the line ID (hereinafter called "DID") of the decoded pixel line and whether the encoded bit stream is decoded successfully, the decoder 45 determines whether to update a decoded ID list, output a control information and store the decoded pixel line in the decoded buffer 45. Here, the display information provided by the display control unit 47 may contain a line ID (hereinafter called "current SID") of a currently displayed pixel line or a combination of a horizontal synchronization (HS) signal and a vertical synchronization (VS) signal. The current SID is outputted from the display control unit 47 and the currently displayed pixel line is being currently displayed by the display 260. When the display information contains the HS signal and the VS signal, the decoder 45 determines the current SID according to the decoded ID list.

Assuming the encoded bit stream is decoded successfully. When the DID is less than the current SID, it means the decoded pixel line associated with the DID leads the decoded pixel line associated with the current SID in a time sequence and thus is useless for display; therefore, the decoder 45 simply discards the decoded pixel line associated with the DID. When the DID is greater than the current SID, it means the decoded pixel line associated with the DID lags the decoded pixel line associated with the current SID in the time sequence; therefore, the decoder 45 updates a decoded ID list according to the DID and the current SID, outputs the control information to the display control unit 47 and stores the decoded pixel line associated with the DID in the decoded buffer 46. In a case that the DID is less than the current SID but the DID indicates its corresponding decoded pixel line belongs to a next frame, the decoder 45 also updates the decoded ID list according to the DID and the current SID, outputs the control information to the display control unit 47 and stores the decoded pixel line associate with the DID in the decoded buffer 46. The control information may contain the decoded ID list or a buffer index.

Figure 4B:
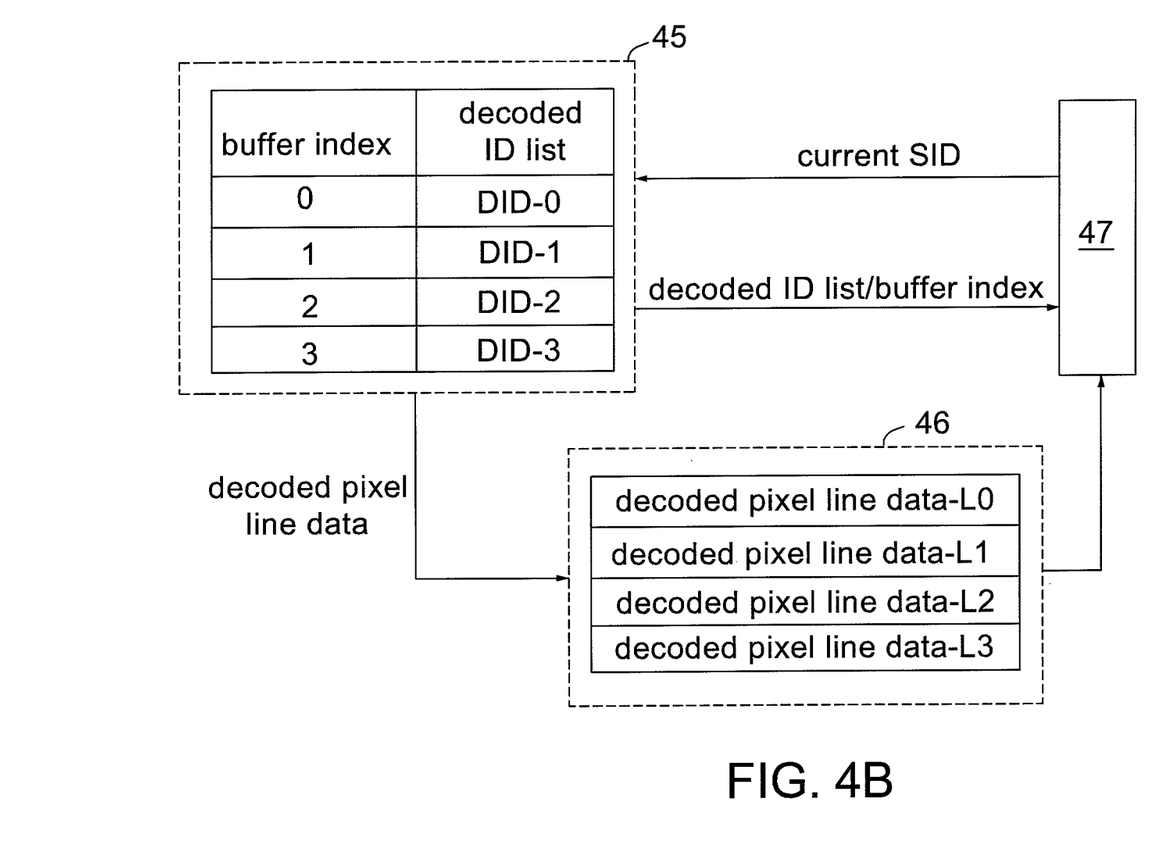
FIG. 4B is an example showing a relation among buffer indexes, a decoded ID list and decoded buffer contents.

FIG. 4B is an example showing a relation among the buffer indexes, the decoded ID list and the decoded buffer contents. Assuming the capacity of the decoded buffer 46 is capable of storing four decoded pixel lines and the display information contains the current SID in FIG. 4B. Four buffer indexes respectively correspond to four DIDs of the decoded ID list and to four decoded pixel lines in the decoded buffer 46. In a case that the control information contains the decoded ID list, the display control unit 47 transfers a corresponding decoded pixel line from the decoded buffer 46 for display according to a line ID (hereinafter called "next SID") of a following displayed pixel line, the decoded ID list and the current SID. When the next SID is found in the decoded ID list, the display control unit 47 transfers the corresponding decoded pixel line associated with the next SID from the decoded buffer 46 to the display 260; otherwise, the display control unit 47 transfers the last displayed pixel line associated with the current SID from the decoded buffer 46 to the display 260.

In a case that the control information contains the buffer index, the decoder 45 determines the buffer index according to the current SID and the decoded ID list. Specifically, the decoder 45 determines a next SID according to the current SID and whether the next SID is found in the decoded ID list. If the next SID is found in the decoded ID list, the decoder 45 outputs the buffer index associated with the next SID; otherwise, the decoder 45 determines a candidate line ID in the decoded ID list that is closest to the next SID and then outputs the buffer index associated with the candidate line ID. Since the decoder 45 and the display control unit 47 operate according to the DID, the current SID, the next SID and the decoded ID list, it is called herein "line-ID-control mechanism."

Figure 5:
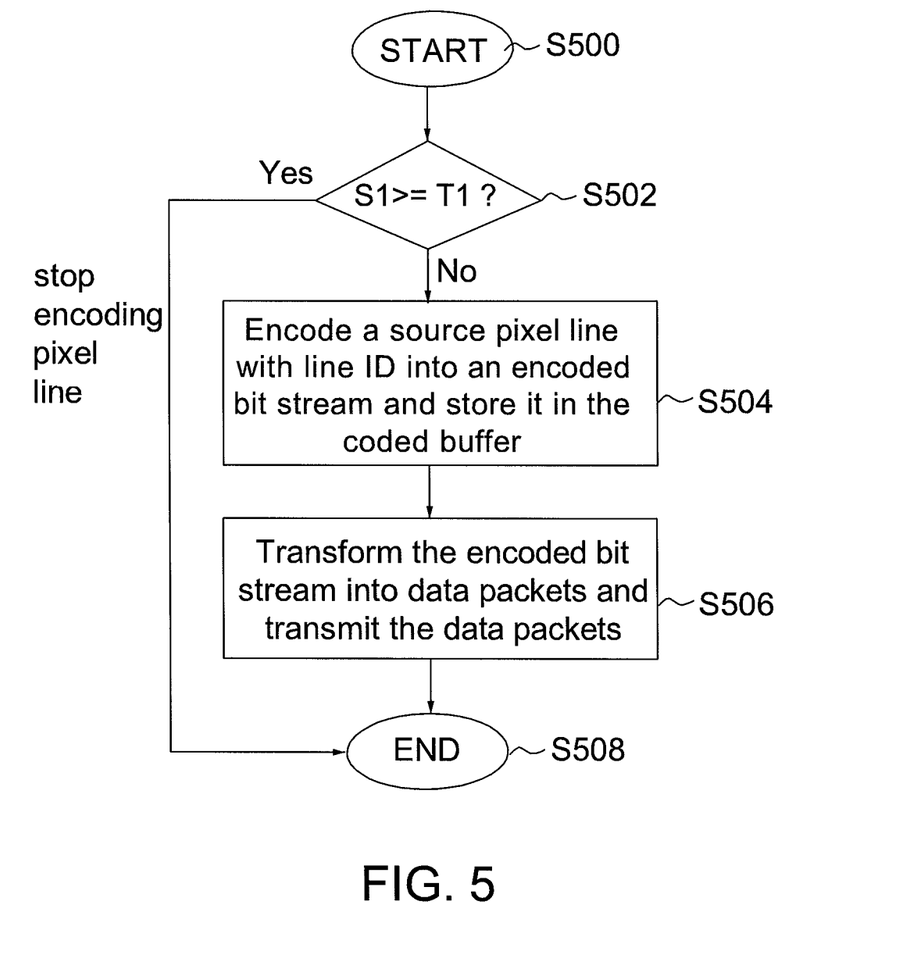
FIG. 5 shows a flow chart of a transmitting method according to an embodiment of the invention.

FIG. 5 shows a flow chart of a transmitting method according to an embodiment of the invention. Hereinafter, the transmitting method of the invention, applied in the transmitting device 220, will be described with reference to FIGS. 2, 3 and 5.

Step S500: Start.

Step S502: Check whether a first buffer fullness contained in a state signal S1 is equal to or greater than a high-level threshold T1. If Yes, go to step S508; otherwise, go to step S504.

Step S504: Encode a source pixel line with a line ID into an encoded bit stream and store the encoded bit stream in the code buffer 33. Here, each encoded bit stream contains a line ID.

Step S506: Transform the encoded bit stream into data packets and transmit the data packets over a communication channel 230.

Step S508: End.

Figure 6:
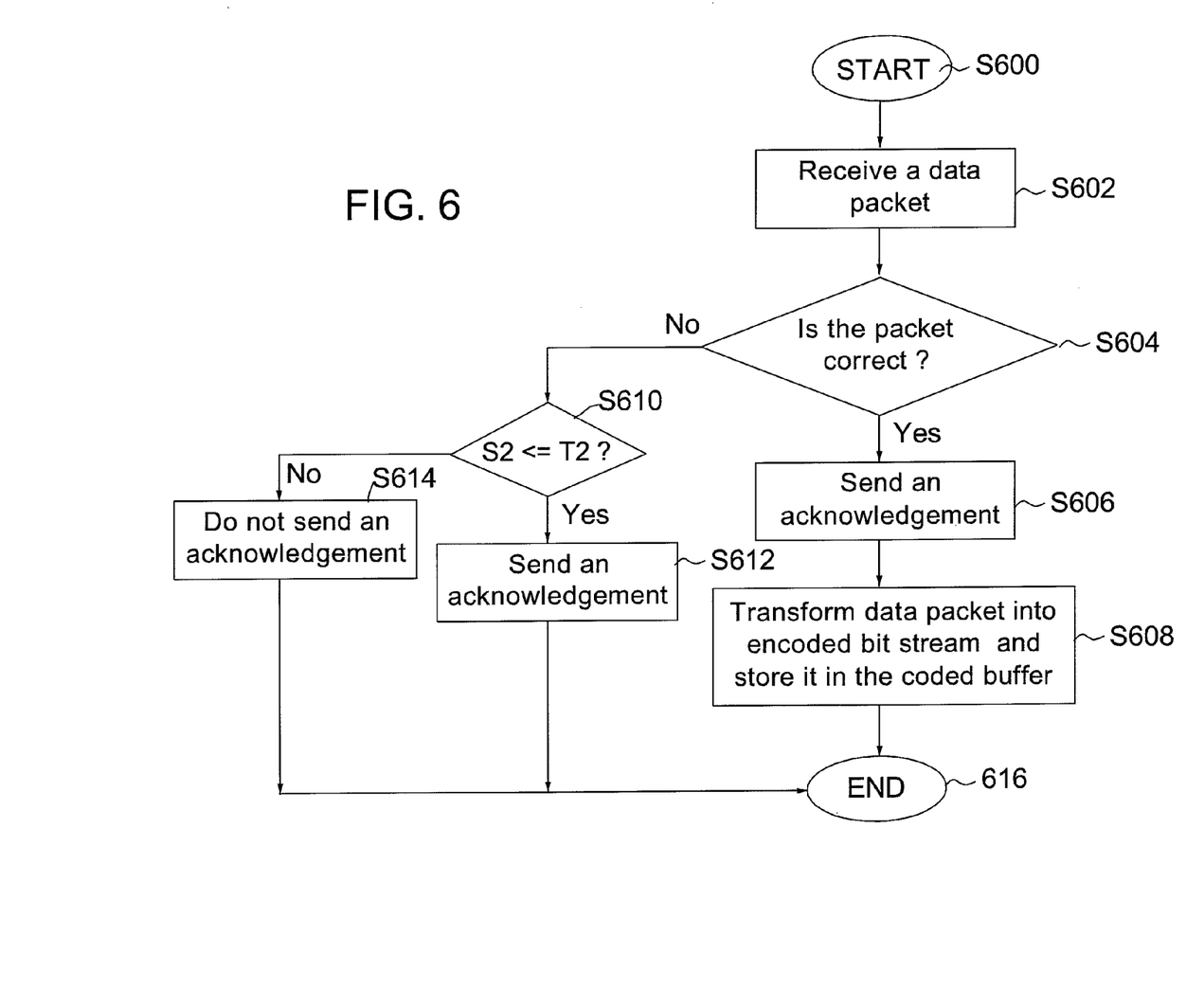
FIG. 6 shows a flow chart of a receiving method according to an embodiment of the invention.

FIG. 6 shows a flow chart of a receiving method according to an embodiment of the invention. Hereinafter, the receiving method of the invention, applied in the receiver 41, will be described with reference to FIGS. 2, 4A and 6.

Step S600: Start.

Step S602: Receive a data packet from the communication channel 230.

Step S604: Check whether a data packet is received correctly. If Yes, go to step S606; otherwise, go to step S610.

Step S606: Send back an acknowledgement to the transmitter 34.

Step S608: Transform the data packet into the encoded bit stream and store it in the coded buffer 43.

Step S610: Check whether a second buffer fullness contained in a state signal S2 is equal to or less than a low-level threshold T2. If Yes, go to step S612; otherwise, go to step S614.

Step S612: Send back an acknowledgement to the transmitter 34.

Step S614: Do not send back an acknowledgement.

Step S616: End

Figure 7:
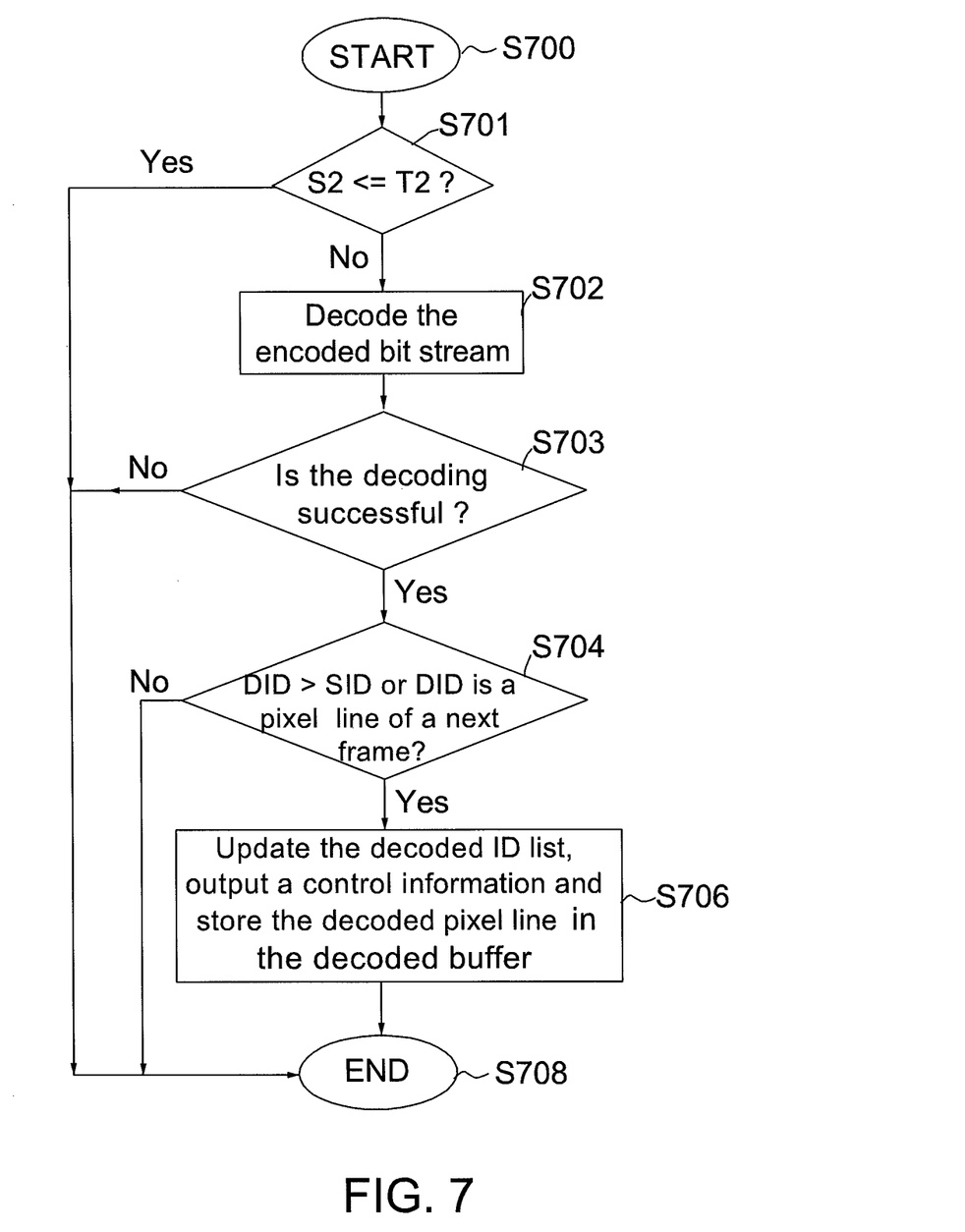
FIG. 7 shows a flow chart of a decoding method according to an embodiment of the invention.

FIG. 7 shows a flow chart of a decoding method according to an embodiment of the invention. Hereinafter, the decoding method of the invention, applied in the decoder 45, will be described with reference to FIGS. 2, 4A-4B and 7.

Step S700: Start.

Step S701: Check whether a second buffer fullness contained in a state signal S2 is equal to or less than a low-level threshold T2. If Yes, go to step S708; otherwise, go to step S702.

Step S702: Decode the encoded bit stream into a decoded pixel line.

Step S703: Check whether the decoding operations are successful. If Yes, go to step S704; otherwise, go to step S708.

Step S704: Check whether the line ID (DID) of the decoded pixel line is greater than a line ID (the current SID) of the currently displayed pixel line according to the display information and the decoded ID list, or the DID indicates its corresponding decoded pixel line belongs to a next frame. If Yes, go to step S706; otherwise, go to step S708.

Step S706: Update a decoded ID list according to the DID and the current SID, output a control information to the display control unit 47 and store the decoded pixel line in the decoded buffer 46. The decoded ID list includes a plurality of DIDs whose corresponding decoded pixel lines are currently stored in the decoded buffer 46. The control information contains the decoded ID list or a buffer index.

Step S708: End.

Figure 8:
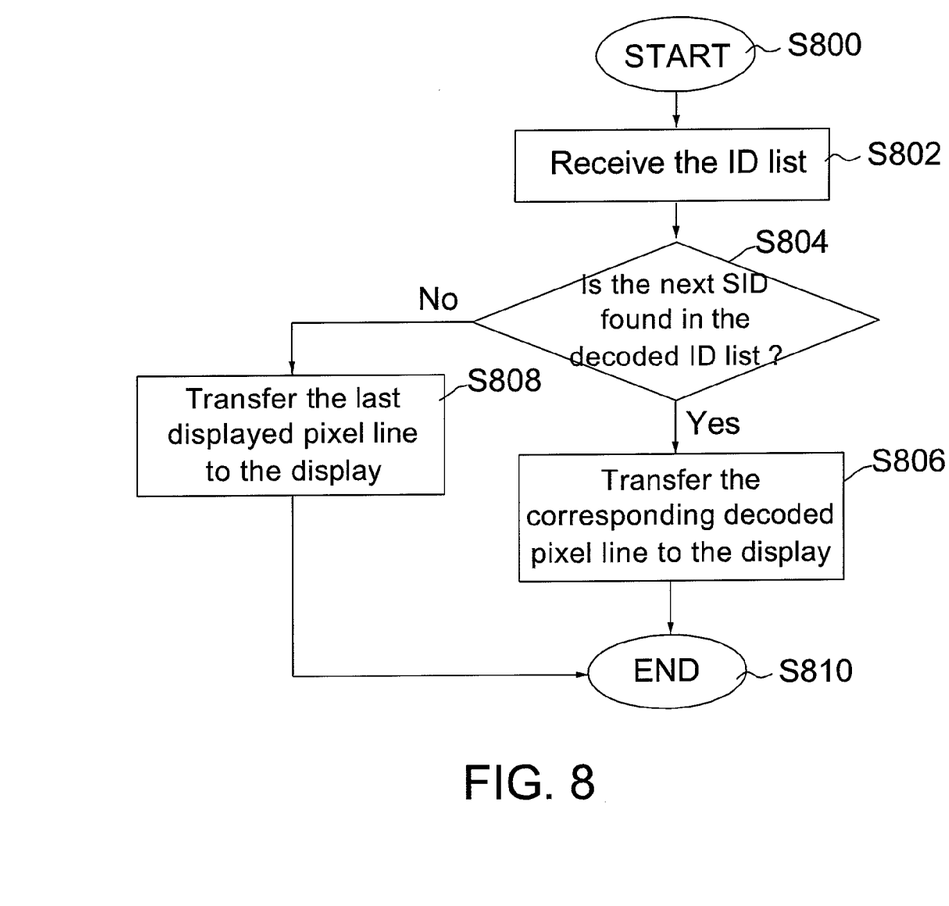
FIG. 8 shows a flow chart of a control method according to an embodiment of the invention.

FIG. 8 shows a flow chart of a control method according to an embodiment of the invention. Hereinafter, the control method of the invention, applied in the display control unit 47, will be described with reference to FIGS. 2, 4A-4B and 8, in a case that the control information contains a decoded ID list.

Step S800: Start.

Step S802: Receive the decoded ID list.

Step S804: Check whether the line ID (next SID) of a following displayed pixel line is found in the decoded ID list. If Yes, go to step S804; otherwise, go to step S806.

Step S806: Transfer the corresponding decoded pixel line associated with the next SID from the decoded buffer 46 to the display 260.

Step S808: Transfer the last displayed pixel line (i.e., the currently displayed pixel line) associated with the current SID from the decoded buffer 46 to the display 260.

Step S808: End.

In sum, the image transmission system of the invention uses line buffers due to its line-based encoding/decoding scheme, to thereby reduce hardware cost. In addition, the image transmission system of the invention conducts a skip-line-encoding mechanism, a stop-retransmitting mechanism and a line-ID-control mechanism, to thereby achieve a real-time transmission/display.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image transmission system, comprising:
a communication channel;
a transmitting device, comprising;
an encoder for determining whether to encode a source pixel line with a first line ID into a first encoded bit stream according to a first state signal;
a first coded buffer for storing the first encoded bit stream and generating the first state signal; and
a transmitter for transforming the first encoded bit stream into data packets and transmitting the data packets over the communication channel; and
a receiving device, comprising:
a receiver for receiving one data packet from the communication channel and determining whether to send an acknowledgement and transform the data packet into a second encoded bit stream according to both a second state signal and whether the data packet is received correctly;
a second coded buffer for storing the second encoded bit stream and generating the second state signal;
a decoded buffer;
a decoder connected between the second coded buffer and the decoded buffer for determining whether to decode the second encoded bit stream into a decoded pixel line according to the second state signal and for determining whether to update a decoded ID list, to output a control information and to store the decoded pixel line in the decoded buffer according to a second line ID of the decoded pixel line, a display information and whether the second encoded bit stream is decoded successfully; and
a display control unit for outputting the display information and transferring a corresponding decoded pixel line for display according to the control information;
wherein the first state signal and the second state signal respectively indicate a first buffer fullness relative to a capacity of the first coded buffer and a second buffer fullness relative to a capacity of the second coded buffer; and
wherein when the second buffer fullness is less than a low-level threshold and the data packet is not received correctly, the receiver sends the acknowledgement over the communication channel to the transmitter.

2. The system according to claim 1, wherein when the first buffer fullness is greater than a high-level threshold, the encoder stops encoding one of a current source pixel line and a following source pixel line, otherwise the encoder keeps encoding.

3. The system according to claim 1, wherein the encoder performs a line-based encoding on the source pixel line to generate the first encoded bit stream, and wherein the decoder performs line-based decoding on the second encoded bit stream to generate the decoded pixel line.

4. The system according to claim 1, wherein the first coded buffer, the second coded buffer and the decoded buffer are implemented with a static random-access memory (SRAM).

5. The system according to claim 1, wherein when the second buffer fullness is greater than a low-level threshold and the data packet is not correctly received, the receiver does not send the acknowledgement over the communication channel to the transmitter.

6. The system according to claim 1, wherein when the data packet is correctly received, the receiver sends the acknowledgement over the communication channel to the transmitter and transform the data packet into the second encoded bit stream.

7. The system according to claim 1, wherein when the second buffer fullness is less than a low-level threshold, the decoder stops decoding operations.

8. The system according to claim 1, wherein the display information is one of a third line ID of a currently displayed pixel line and a combination of a horizontal synchronization signal and a vertical synchronization signal.

9. The system according to claim 1, wherein the decoder determines a third line ID of a currently displayed pixel line according to the decoded ID list and the display information.

10. The system according to claim 9, wherein when the second encoded bit stream is decoded successfully and the second line ID is greater than the third line ID, the decoder updates the decoded ID list according to both the second line ID and the third line ID and stores the decoded pixel line in the decoded buffer.

11. The system according to claim 9, wherein when the second encoded bit stream is decoded successfully and the second line ID indicates the decoded pixel line belongs to a next frame, the decoder updates the decoded ID list according to both the second line ID and the third line ID and stores the decoded pixel line in the decoded buffer.

12. The system according to claim 9, wherein the control information comprises the decoded ID list, and wherein the display control unit transfers the corresponding decoded pixel line for display according to a fourth line ID of a following displayed pixel line, the decoded ID list and the third line ID.

13. The system according to claim 12, wherein when the fourth line ID is found in the decoded ID list, the display control unit transfers the corresponding decoded pixel line associated with the fourth line ID from the decoded buffer for display, otherwise the display control unit transfers the currently displayed pixel line associated with the third line ID for display.

14. The system according to claim 9, wherein the control information comprises a buffer index, wherein the decoder generates the buffer index according to the decoded ID list and the third line ID, and wherein the display control unit transfers a corresponding decoded pixel line associated with the buffer index from the decoded buffer for display.

15. A transmission method applied in an image transmission system having a communication channel, a transmitting device and a receiving device, wherein the transmitting device comprises a first coded buffer and the receiving device comprises a second coded buffer and a decoded buffer, the method comprising:
determining whether to encode a source pixel line with a first line ID into a first encoded stream, and to store the first encoded stream in the first code buffer according to a first state signal;
transforming the first encoded bit stream into data packets and transmitting the data packets over the communication channel;
determining whether to send an acknowledgement in response to one data packet from the communication channel, transform the data packet into a second encoded bit stream and store the second encoded bit stream in the second coded buffer according to a second state signal and whether the data packet is received correctly;

determining whether to decode the second encoded bit stream into a decoded pixel line according to the second state signal;

determining whether to update a decoded ID list, to output a control information and to store the decoded pixel line in the decoded buffer according to a second line ID of the decoded pixel line, a display information and whether the second encoded bit stream is decoded successfully; and outputting the display information and transferring a corresponding decoded pixel line for display according to the control information;

wherein the first state signal and the second state signal are generated by the first coded buffer and the second coded buffer;

wherein the first state signal and the second state signal respectively indicate a first buffer fullness relative to a capacity of the first coded buffer and a second buffer fullness relative to a capacity of the second coded buffer; and wherein the step of determining whether to send the acknowledgement further comprises:

sending the acknowledgement over the communication channel to the transmitting device by the receiving device when the second buffer fullness is less than a low-level threshold and the data packet is not received correctly.

16. The method according to claim 15, wherein the step of determining whether to encode the source pixel line further comprises:

when the first buffer fullness is greater than a high-level threshold, stopping encoding one of a current source pixel line and a following source pixel line, otherwise keep performing encoding operations on the current source pixel line.

17. The method according to claim 16, wherein the encoding operations are line-based encoding operations.

18. The method according to claim 15, wherein the first coded buffer, the second coded buffer and the decoded buffer are implemented with a static random-access memory (SRAM).

19. The method according to claim 15, wherein the step of determining whether to send the acknowledgement further comprises:

not sending the acknowledgement over the communication channel to the transmitting device by the receiving device when the second buffer fullness is greater than a low-level threshold and the data packet is not received correctly.

20. The method according to claim 15, wherein the step of determining whether to send the acknowledgement further comprises:

sending the acknowledgement over the communication channel to the transmitting device and transforming the data packet into the second encoded bit stream by the receiving device when the data packet is correctly received.

21. The method according to claim 15, wherein the step of determining whether to decode the second encoded bit stream further comprises:

stopping decoding when the second buffer fullness is less than a low-level threshold.

22. The method according to claim 15, wherein the display information is one of a third line ID of a currently displayed pixel line and a combination of a horizontal synchronization signal and a vertical synchronization signal.

23. The method according to claim 15, further comprising:

determining a third line ID of a currently displayed pixel line according to the decoded ID list and the display information.

24. The method according to claim 23, wherein the step of determining whether to update the decoded ID list, output the control information and store the decoded pixel line further comprises:

updating the decoded ID list according to both the second line ID and the third line ID, outputting the control information and storing the decoded pixel line in the decoded buffer when the second encoded bit stream is decoded successfully and the second line ID is greater than the third line ID.

25. The method according to claim 23, wherein the step of determining whether to update the decoded ID list, output the control information and store the decoded pixel line further comprises:

updating the decoded ID list according to both the second line ID and the third line ID, outputting the control information and storing the decoded pixel line in the decoded buffer when the second encoded bit stream is decoded successfully and the second line ID indicates the decoded pixel line belongs to in a next frame.

26. The method according to claim 23, wherein the control information comprises the decoded ID list, and wherein the step of transferring the corresponding decoded pixel line comprises:

transferring the corresponding decoded pixel line for display according to a fourth line ID of a following displayed pixel line, the decoded ID list and the third line ID.

27. The method according to claim 26, wherein the step of outputting the display information and transferring the corresponding decoded pixel line comprises:

outputting the display information; and when the fourth line ID is found in the decoded ID list, transferring the corresponding decoded pixel line associated with the fourth line ID from the decoded buffer for display, otherwise transferring the currently displayed pixel line for display.

28. The method according to claim 23, wherein the control information comprises a buffer index, further comprising:

generating the buffer index according to the decoded ID list and the third line ID; and transferring a corresponding decoded pixel line associated with the buffer index from the decoded buffer for display.

29. A receiving device, comprising:

a receiver for receiving a data packet, which is transformed from a first encoded bit stream stored in a first coded buffer and is transmitted over a communication channel, and determining whether to send an acknowledgement and transform the data packet into a second encoded bit stream according to both a state signal and whether the data packet is received correctly;

a second coded buffer for storing the second encoded bit stream and generating the state signal;

a decoded buffer;

a decoder connected between the second coded buffer and the decoded buffer for determining whether to decode the second encoded bit stream into a decoded pixel line according to the second state signal and for determining whether to update a decoded ID list, to output a control information and to store the decoded pixel line in the decoded buffer according to a first line ID of the decoded pixel line, a display information and whether the encoded bit stream is decoded successfully; and a display control unit for outputting the display information and transferring a corresponding decoded pixel line for display according to the control information;

wherein the first state signal and the second state signal respectively indicate a first buffer fullness relative to a capacity of the first coded buffer and a second buffer fullness relative to a capacity of the second encoded buffer;

wherein when the second buffer fullness is less than a low-level threshold and the data packet is not correctly received, the receiver sends the acknowledgement over a communication channel to a transmitter.

30. The device according to claim 29, wherein when the buffer fullness is greater than a low-level threshold and the corresponding data packet is not correctly received, the receiver does not send the acknowledgement over a communication channel to a transmitter.

31. The device according to claim 29, wherein when the data packet is correctly received, the receiver sends the acknowledgement over a communication channel to a transmitter and transform the data packet into the encoded bit stream.

32. The device according to claim 29, wherein when the buffer fullness is less than a low-level threshold, the decoder stops decoding operations.

33. The device according to claim 29, wherein the display information is one of a second line ID of a currently displayed pixel line and a combination of a horizontal synchronization signal and a vertical synchronization signal.

34. The device according to claim 29, wherein the decoder determines a second line ID of a currently displayed pixel line according to the decoded ID list and the display information.

35. The device according to claim 34, wherein when the encoded bit stream is decoded successfully and the first line ID is greater than the second line ID, the decoder updates the decoded ID list according to both the first line ID and the second line ID and stores the decoded pixel line in the decoded buffer.

36. The device according to claim 34, wherein when the encoded bit stream is decoded successfully and the first line ID indicates the decoded pixel line belongs to a next frame, the decoder updates the decoded ID list according to both the first line ID and the second line ID and stores the decoded pixel line in the decoded buffer.

37. The device according to claim 34, wherein the control information comprises the decoded ID list, and wherein the display control unit transfers a corresponding decoded pixel line according to a third line ID of a following displayed pixel line, the decoded ID list and the second line ID.

38. The device according to claim 37, wherein when the third line ID is found in the decoded ID list, the display control unit transfers the following displayed pixel line associated with the third line ID from the decoded buffer for display, otherwise the display control unit transfers the currently displayed pixel line associated with the second line ID for display.

39. The device according to claim 34, wherein the control information comprises a buffer index, wherein the decoder generates the buffer index according to the decoded ID list and the second line ID, and wherein the display control unit transfers a corresponding decoded pixel line associated with the buffer index from the decoded buffer for display.

40. The device according to claim 29, wherein the decoder performs line-based decoding on the encoded bit stream to generate the decoded pixel line.

41. The device according to claim 29, wherein the coded buffer and the decoded buffer are implemented with a static random-access memory (SRAM).

42. A transmitting device, comprising:
an encoder for determining whether to encode a source pixel line with a corresponding line ID into an encoded bit stream according to a state signal;
a coded buffer for storing the encoded bit stream and generating the state signal; and
a transmitter for transforming the encoded bit stream into data packets and transmitting the data packets over a communication channel;
wherein the state signal indicates a buffer fullness relative to a capacity of the coded buffer; and
wherein the coded buffer is implemented with a static random-access memory (SRAM).

43. The device according to claim 42, wherein when the buffer fullness is greater than a high-level threshold, the encoder stops encoding at least one of a current source pixel line and a following source pixel line, otherwise the encoder keeps encoding.

44. The device according to claim 42, wherein the encoder performs a line-based encoding on the source pixel line to generate the encoded bit stream.

* * * * *